United States Patent
Stitt et al.

(10) Patent No.: US 11,102,280 B1
(45) Date of Patent: Aug. 24, 2021

(54) INFRASTRUCTURE IMPORTS FOR AN INFORMATION TECHNOLOGY PLATFORM

(71) Applicant: HashiCorp, San Francisco, CA (US)

(72) Inventors: Cameron Stitt, San Francisco, CA (US); Chris Marchesi, San Francisco, CA (US)

(73) Assignee: HASHICORP, San Francisco, CA (US)

( * ) Notice: Subject to any disclaimer, the term of this patent is extended or adjusted under 35 U.S.C. 154(b) by 0 days.

(21) Appl. No.: 17/014,606

(22) Filed: Sep. 8, 2020

(51) Int. Cl.
*H04L 29/08* (2006.01)
*H04L 12/24* (2006.01)

(52) U.S. Cl.
CPC .......... *H04L 67/10* (2013.01); *H04L 41/0893* (2013.01); *H04L 41/5096* (2013.01)

(58) Field of Classification Search
CPC .. H04L 67/10; H04L 41/0893; H04L 41/5096
See application file for complete search history.

(56) References Cited

U.S. PATENT DOCUMENTS

| 10,805,171 | B1* | 10/2020 | Anwer | H04L 41/0893 |
| 2015/0269383 | A1* | 9/2015 | Lang | H04L 63/20 726/1 |
| 2020/0007582 | A1* | 1/2020 | Dixit | H04L 41/0893 |
| 2020/0136994 | A1* | 4/2020 | Doshi | G06F 9/45533 |
| 2020/0322218 | A1* | 10/2020 | Anwer | H04L 41/16 |

* cited by examiner

*Primary Examiner* — Michael Won
(74) *Attorney, Agent, or Firm* — Kilpatrick Townsend & Stockton LLP (57) ABSTRACT

A method includes a dispatch node receiving a policy file and infrastructure plan data from a cloud infrastructure provisioning platform. The policy file comprises one or more imports that include a configuration import, a plan import, and/or a state import. Each import of the one or more imports comprises one or more data fields. The dispatch node parses the policy file to determine at least the one or more imports. The dispatch node queries the infrastructure plan data stored in a memory via an API for object data related to the one or more data fields of the one or more imports. The dispatch node determines, based on the query, the object data via the API. The dispatch node executes the policy file based on the object data to obtain a policy check result. The dispatch node then provides the policy check result to the cloud infrastructure provisioning platform.

20 Claims, 4 Drawing Sheets

INFRASTRUCTURE IMPORTS FOR AN INFORMATION TECHNOLOGY PLATFORM

BACKGROUND

Companies and organizations are transitioning their information technology (IT) resources to a cloud computing paradigm. This transition means shifting from largely dedicated servers in a private datacenter to a pool of computing capacity available on demand from one or more, and oftentimes many, cloud service providers. The foundation for adopting the cloud is infrastructure provisioning, which is the allocation of a cloud provider's resources and services to a customer based on the customer's needed and planned configurations. Several products exist to provision cloud infrastructure for any IT application, using an array of cloud providers for any target cloud platform.

Policies can be provided when provisioning cloud infrastructure to influence a decision of whether or not to implement a change in the cloud infrastructure. However, typically a system that evaluates the policies will receive a raw data file including lower-level data primitives that describe the cloud infrastructure. Any policies need to be complex enough to deal with the raw data file.

This is problematic because working with these lower-level data primitives causes errors and confusion in the evaluation of a policy.

Embodiments of the disclosure address this problem and other problems individually and collectively.

SUMMARY

Various embodiments described herein are related to methods and systems for infrastructure imports for an information technology platform.

In some implementations of the current subject matter, a method can be performed by a dispatch node. The method includes the dispatch node receiving a policy file and infrastructure plan data from a cloud infrastructure provisioning platform. The policy file comprises one or more imports. The one or more imports include a configuration import, a plan import, and/or a state import. Each import of the one or more imports comprises one or more data fields. After receiving the policy file and the infrastructure plan data, the dispatch node parses the policy file to determine at least the one or more imports. The dispatch node then queries the infrastructure plan data stored in a memory via an API for object data related to the one or more data fields of the one or more imports. The dispatch node then determines the object data via the API based on the query. After determining the object data, the dispatch node executes the policy file based on the object data to obtain a policy check result. The dispatch node can then provide the policy check result to the cloud infrastructure provisioning platform.

In some implementations of the current subject matter, a dispatch node for managing imports of a cloud infrastructure provisioning platform can include at least one data processor and at least one memory. The memory stores instructions, which when executed by the data processor, result in performing the above noted method.

In some implementations of the current subject matter, a method can be performed by a cloud infrastructure provisioning platform. The cloud infrastructure platform provides a policy file and infrastructure plan data to a policy check platform. The policy check platform comprises at least a dispatch node. Upon receiving the policy file and the infrastructure plan data, the dispatch node parses the policy file to determine at least one or more imports. The dispatch node can then query the infrastructure plan data stored in a memory via an API for object data related to the one or more data fields of the one or more imports. Based on the query the dispatch node determines the object data via the API and then executes the policy file based on the object data to obtain a policy check result. The dispatch node then provides the policy check result to the cloud infrastructure provisioning platform. The cloud infrastructure provisioning platform then receives the policy check result.

In some variations one or more of the following features can optionally be included in any feasible combination. For example, in some embodiments, the policy file is created by client computer. The client computer provides the policy file to the cloud infrastructure provisioning platform, which provides the policy file to a policy check platform. The policy check platform provides the policy file to the dispatch node.

In other embodiments, the dispatch node is instantiated by a policy check platform prior to receiving the policy file.

In other embodiments, the dispatch node, when executing the policy file, can filter the received object data based on the policy file.

In other embodiments, the cloud infrastructure provisioning platform stores an infrastructure plan. After the dispatch node queries the cloud infrastructure provisioning platform for object data, the cloud infrastructure provisioning platform determines the object data based on the query and the infrastructure plan.

In other embodiments, the one or more data fields are indexed with a resource address or a module address.

In other embodiments, the object data includes configuration data, plan data, and/or state data.

In other embodiments, prior to the cloud infrastructure provisioning platform providing the policy file to the policy check platform, the cloud infrastructure provisioning platform receives an infrastructure configuration.

In other embodiments, the cloud infrastructure provisioning platform can generate the infrastructure plan data based on the infrastructure configuration.

In other embodiments, the query for the object data is an API call.

In other embodiments, the cloud infrastructure provisioning platform can receive a policy file from an API client/browser. The policy file comprises one or more imports. The one or more imports include a configuration import, a plan import, and/or a state import. Each import of the one or more imports comprises one or more data fields. After receiving the policy check result from the dispatch node, the cloud infrastructure provisioning platform provides the policy check result to the API client/browser.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a cloud computing platform, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Prior to discussing embodiments of the disclosure, some terms can be described in further detail.

A "dispatch node" can include an instance of software and/or hardware capable of performing work. A dispatch node can be a non-persistent node in a cloud computing cluster. In some embodiments, a dispatch node can be instantiated by a policy check platform.

A "configuration file" can be a file representing a configuration. A configuration file can represent a configuration of a requested cloud infrastructure. For example, a configuration file can be created by a user of a client computer and provided to a cloud infrastructure provisioning platform. The cloud infrastructure provisioning platform can be a platform configured to provision cloud infrastructure based on a configuration file. For example, a user may request additional resources (e.g., virtual machines) be introduced to a currently existing cloud infrastructure. The configuration file can indicate the addition of the virtual machines to the cloud infrastructure.

An "infrastructure plan file" can be a file created as a result of a cloud infrastructure provisioning platform plan. An infrastructure plan file can represent the changes that the cloud infrastructure provisioning platform needs to make to currently existing infrastructure to reach the desired state represented by one or more imports. The infrastructure plan file can include data (e.g., infrastructure plan data) that a "plan import" can access.

A "policy file" can include a data file that includes one/or more course or principle of action. A policy file can include a policy as code document. In some embodiments, a policy file can include code written in a high-level language to manage and/or automate policies. A policy file can include one or more imports.

An "import" can include a group of functions, data types, and/or collections. An import can be of any suitable type, for example, a configuration import, a plan import, a state import, etc. An import can be accessed by a first device (e.g., a dispatch node) from a second device (e.g., a cloud infrastructure provisioning platform). For example, the second device can create data provided in an import, and allow the first device to make an API call to access the data in the import. An import can include one or more collections. In various embodiments, a particular collection may be included in one or more imports. For example, the plan import can include a planned values collection that relates to data for a predicted state (e.g., a state of the provisioned cloud infrastructure after an update). The state import can also include the planned values collection.

The configuration import can provide a representation of the configuration of the cloud infrastructure as it is seen at plan time. The configuration import can allow the first device (e.g., the dispatch node) to perform processing based on data related to a configuration (e.g., a configuration file which describes a to be provisioned cloud-based infrastructure), without the first device needing to receive a full configuration file. The configuration import can include various data collections. For example, the configuration import can include a providers collection. The providers collection can represent data for all provider instances across all modules in the configuration of the cloud infrastructure. The configuration import can include additional collections that relate to the configuration of the cloud infrastructure prior to any changes being requested and/or being applied to the cloud infrastructure. For example, the configuration import can further include collections related to resources of the cloud infrastructure (e.g., a resources collection), provisioners included in the cloud infrastructure (e.g., a provisioners collection), variables of the cloud infrastructure (e.g., a variables collection), and/or module calls of the cloud infrastructure (e.g., a module calls collection).

The plan import can provide a representation of the cloud infrastructure plan. For example, the plan import can represent a planned change to the cloud infrastructure. The plan import can include a number of collections that relate to a plan that can be implemented to augment the cloud infrastructure. In some embodiments, the plan import can include collections related to data that may be changed in the cloud infrastructure. For example, the plan import can include collections that relate to variables of the planned changes to the cloud infrastructure (e.g., a variables collection), planned values of the changes to the cloud infrastructure (e.g., a planned values collection), resource changes that can be made when changing the cloud infrastructure (e.g., a resource changes collection), and/or changes to the outputs of the cloud infrastructure (e.g., an output changes collection).

The state import can include data relevant to the state of the existing cloud infrastructure state at plan time. The state import can include a number of collections that relate to the initial state of the cloud infrastructure before any changes are implemented. For example, the state import can include data collections that relate to a current version of the cloud infrastructure state, outputs of modules of the current state (e.g., an outputs collection), and/or current resources of the current state (e.g., a resources collection). For example, the state import can include any suitable resource information in the resources collection that relates to currently implemented resources in the cloud infrastructure.

A "collection" can include a data structure that includes a grouping of a variable number of data fields that have shared attributes and/or characteristics. For example, a collection can include lists, sets, multisets, trees, etc. and can include a plurality of data fields. For example, a collection of providers, which is included in a configuration import, can include data fields which relate to providers (e.g., provider name, provider alias, a module address, provider configuration values, provider version constraints, etc.). A collection can include groupings of data fields that relate to any suitable shared attributes and/or characteristics. For example, data fields in a collection can relate to providers, resources, provisioners, variables, outputs, module calls, planned values, resource changes, output changes, etc.

"Object data" can include data related to an object, which can be a variable, a data structure, a function, and/or a method. Object data can include any data that can be provided in response to an API call. Object data can include data relating to data fields of a collection. For example, a device can receive an API call which includes a query for a particular set of data fields in a collection in an import (e.g., a query for data related to a mode, a type, a name, etc. of a resources collection in a configuration import). An API response can include object data for the data fields (e.g., a mode, a type, a name, etc.).

A "policy check result" can include a result of evaluating a policy. In some embodiments, a policy check result can be a result of executing a policy file, which can be a policy-as-code file. For example, a policy file can be evaluated based on at least object data. A policy file can include one or more policies included as code, and can be executed by a dispatch node to determine whether or not a cloud-based infrastructure that is currently being provisioned is consistent with the one or more policies. In some embodiments, a policy check result can be a Boolean that indicates whether or not the policies are being adhered to. In other embodiments, the policy check result can include one or more indications indicating whether or not one or more policies are being adhered to.

An "application programming interface" (API) can include a computing interface to a software component or a system. An API can define how other components or systems can use the computing interface. An API can define types of API calls (e.g., queries) that can be made, how to make the calls, the data formats that should be used for the calls, the conventions to follow for the calls, etc.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

I. Introduction

Various embodiments described herein provide for next-generation cloud infrastructure provisioning platform imports. Data from the cloud infrastructure provisioning platform can be introduced under an import namespace (e.g., tf[config|plan|state]). Various embodiments provide systems and/or methods to at least establish and utilize one or more imports to perform a policy check related to a provisioned cloud infrastructure (e.g., cloud-based infrastructure).

Various embodiments include a system comprising a client computer, a cloud infrastructure provisioning platform, and a policy check platform. The client computer can provide configuration plans and policy files to the cloud infrastructure provisioning platform. The configuration plans can include any suitable plans to change the configuration of an existing cloud infrastructure. For example, the configuration plans can indicate a change in a number of resources (e.g., server computers, virtual machines, etc.) in the existing cloud infrastructure. The policy file can include any suitable policy that can be verified by the policy check platform prior to the cloud infrastructure provisioning platform implementing the changes to the existing cloud infrastructure (e.g., by adding the specified resources). The policy file can be a policy as code document and can include one or more imports. The client computer can provide a particular configuration plan and a policy file together or separately at any suitable point in time.

After receiving the configuration plan, the cloud infrastructure provisioning platform can create infrastructure plan data based on the configuration plan. The infrastructure plan data indicates the changes that the cloud infrastructure provisioning platform needs to make to the existing cloud infrastructure to reach the desired state. An infrastructure plan file can include the infrastructure plan data that one or more imports (e.g., a plan import) can access.

The data from the cloud infrastructure provisioning platform, upon which a policy can be evaluated, can include data in an infrastructure plan (e.g., implemented as any suitable type of data file, such as a JSON file). The infrastructure plan can include a property that is an array that defines where the source code for the module resides (e.g., a repository property of a JSON file). The repository location as indicated by the repository property can provide higher-level data files (e.g., Go type data files) for processing infrastructure plan data and, in some embodiments, schema data (e.g., data for annotating and validating JSON documents) in an idiomatic way (e.g., the program contains statements that are unique to the language). As such, in some embodiments, the repository property of the infrastructure plan can point towards a repository that can include higher-level data types that may be in a different programming language (e.g., Go), but may be programmed idiomatically in a JSON convention. However, it is understood that the infrastructure plan can be of any suitable data file type.

After creating the infrastructure plan data, the cloud infrastructure provisioning platform can provide the infrastructure plan data and the policy file to the policy check platform. The policy check platform can the proceed to verify that the proposed changes indicated by the infrastructure plan data comply with the policy file. For example, the policy check platform (or a dispatch node instantiated thereby) can parse the policy file to determine the one or more imports. After determining the one or more imports, the policy check platform can query the received infrastructure plan data (e.g., from a memory) via an API for object data related to one or more fields of the one or more imports. In some embodiments, the query can be referred to as an API call. The object data can be related to the one or more collections of the one or more imports. For example, if the API call queried the infrastructure plan data for a number of resources of the plan import, the object data can include the returned resource data (e.g., a number of resources, types of resources, resource modes, etc.).

As such, the policy check platform can execute the policy file based on the object data to obtain a policy check result. For example, the policy check platform can determine whether or not the changes indicated by the infrastructure plan data are compliant with the policy file. As an illustrative example, the policy file can include a limit to the number of resources provided in a provisioned cloud infrastructure at a given time. For example, the policy check platform can whether or not the number of resources of proposed changes in the infrastructure plan data (e.g., 812) exceed the number of resources of the policy file (e.g., 1000). The policy check result, in this example, can indicate that the proposed changes in the infrastructure plan data comply with the policy file.

The policy check platform can then provide the policy check result to the cloud infrastructure provisioning platform. The infrastructure provisioning platform can determine whether or not to deploy the cloud infrastructure based on the infrastructure plan data based on the policy check result. The policy check platform can further notify the client computer regarding the policy check and/or the deployment of the changes to the cloud infrastructure.

Various embodiments provide for methods and systems that allow for the policy check platform to evaluate the policy file using the API to query the infrastructure plan data. The policy check platform can receive the infrastructure plan data from the cloud infrastructure provisioning platform, but may not need to evaluate and/or utilize the entirety of the policy file. In some embodiments, the policy check platform may not directly need or be able to read the infrastructure plan data. Rather, the policy check platform can utilize the imports included in the policy file to obtain data from the infrastructure plan data. Due to the use of the imports in the policy file, complexity of the policy file can be greatly reduced.

Embodiments provide for ease of use of the policy files to users of client computers. The imports can allow the policy files to be highly abstracted from the infrastructure plan data that can be highly complex. By doing so, the cloud infrastructure provisioning platform can deploy highly complex cloud infrastructure while the policy check platform can provide highly abstracted interfaces for users to influence the provisioning of the cloud infrastructure.

II. Systems

Figure 1:
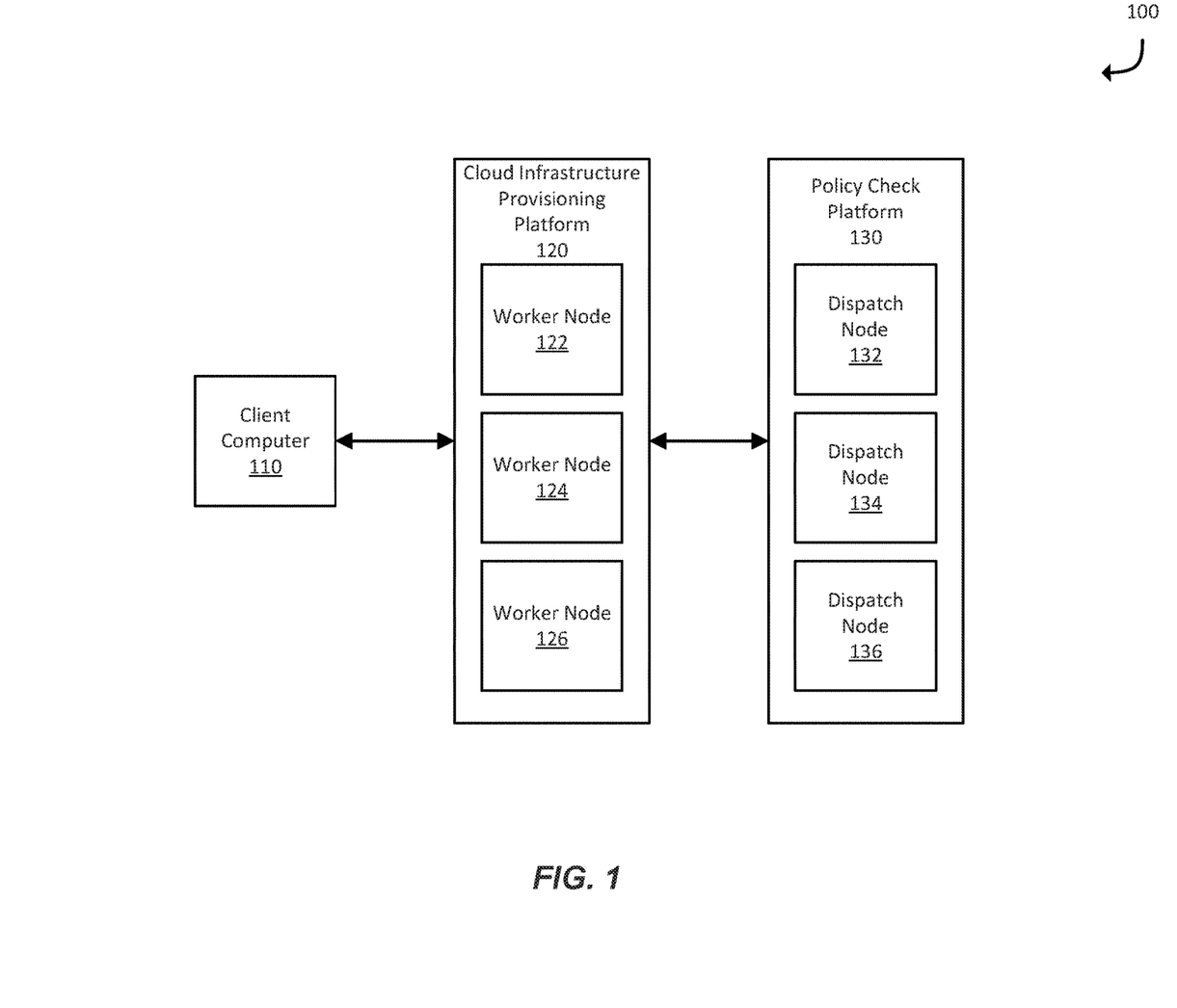
FIG. 1 depicts a system diagram illustrating a cloud infrastructure provisioning framework, in accordance with some example embodiments.

FIG. 1 depicts a system diagram illustrating a cloud computing platform, in accordance with some example embodiments. FIG. 1 illustrates a framework for provisioning cloud infrastructure based on resources planned or configured for being provisioned from one or more cloud providers. System 100 includes a client computer 110, a cloud infrastructure provisioning platform 120 comprising a plurality of worker nodes (122, 124, and 126), and a policy check platform 130 comprising a plurality of dispatch nodes (132, 134, and 136).

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

The client computer 110 can include computing devices such as a smartphones, laptop computers, desktop computers, tablets, etc. The client computer 110 can connect to the cloud infrastructure provisioning platform 120, for example, via an API and/or one or more client applications. For example, the one or more client applications can consist of software and/or hardware that can be configured to communicate with the cloud infrastructure provisioning platform 120. The client applications can include web browsers, mobile application, web applications, etc. In some embodiments, the client computer 110 can include a version control system (VCS) that allows for implementation of various versions of data (e.g., configuration files). For example, a version control system can be a webpage implemented version control system accessed by the client computer 110. One such example of a version control system is Git, however, it is understood any suitable version control system can be utilized according to various embodiments.

The cloud infrastructure provisioning platform 120 can be a platform configured to provision cloud infrastructure, for example, based on a configuration file (e.g., an infrastructure configuration file). The configuration file can be created by a user of client computer 110 (or other suitable device) and provided to the cloud infrastructure provisioning platform 120. The configuration file can indicate a configuration of a provisioned cloud infrastructure that the user is requesting. For example, the user may request additional resources (e.g., virtual machines) be introduced to a currently existing cloud infrastructure. The configuration file can indicate the addition of the virtual machines to the cloud infrastructure.

The cloud infrastructure provisioning platform 120 can also be configured to receive policy file(s) from the client computer 110, which can then be provided to the policy check platform 130. The cloud infrastructure provisioning platform 120 can include any suitable number of worker nodes (e.g., worker nodes 122, 124, and 126). The cloud infrastructure provisioning platform 120 and/or the worker nodes 122, 124, and 126 can include a number of processing modules to receive data representing a set of resources, such as the configuration file, for some or all of a cloud-based infrastructure. For example, the configuration file can convey a change or upgrade to a cloud-based computing function or application, or can represent a change in a number of instances employed by an organization's cloud-based infrastructure.

The worker nodes 122, 124, and 126 can perform any suitable processing for the cloud infrastructure provisioning platform 120. Any processing described herein can be delegated to one or more worker nodes 122, 124, and 126. For example, the worker node 122 can perform a planning step to plan changes to a provisioned cloud infrastructure. The worker node 122 can perform planning as described at step 308, below. For example, the worker node 122 can assemble any suitable inputs to generate a cloud infrastructure plan for a run-phase that will accommodate the technical specification and proposed changes. The worker node 122 can receive the configuration file (e.g., from the client computer 110) and create an infrastructure plan file including infrastructure plan data. The infrastructure plan file can represent the changes that the cloud infrastructure provisioning platform 120 needs to make to currently existing infrastructure to reach the desired state represented by one or more imports.

As another example, the worker node 124 can perform a cost estimation step, as described herein at step 310. The worker node 124 can generate a per-resource hourly, a monthly cost, a monthly cost delta, etc. During cost estimation, the worker node 124 can receive price information from a set of price resolvers that resolve a price for each resource specified by the cloud infrastructure provisioning platform 120, and which price is provided by the cloud providers or other resource providers via provider APIs.

In some embodiments, the worker nodes 122, 124, and 126 can instantiated and destroyed at any suitable point in time by the cloud infrastructure provisioning platform 120. As such, the worker nodes 122, 124, and 126 can be available when needed for computations, but do not require a consistent deployment of computing resources. The cloud infrastructure provisioning platform 120 can instantiate any suitable number of worker nodes 122, 124, and 126 to perform processing at a given time.

The policy check platform 130 can be a platform configured to, at least, execute policy files, for example, received from the cloud infrastructure provisioning platform 120. The policy check platform 130 can include any suitable number of dispatch nodes (e.g., dispatch nodes 132, 134, and 136). The dispatch nodes can perform any suitable processing for the policy check platform 130. The dispatch nodes 132, 134, and 136 can be similar to the worker nodes 122, 124, and 126. In some embodiments, the dispatch nodes 132, 134, and 136 can instantiated and destroyed at any suitable point in time by the policy check platform 130. As such, the dispatch nodes 132, 134, and 136 can be available when needed for computations, but do not require a consistent deployment of computing resources. For example, the policy check platform 130 can instantiate any suitable number of dispatch nodes to evaluate policy files, as described in further detail herein. The policy check platform 130 can destroy (e.g., stop the persistence of) the dispatch node.

As an example, the dispatch node 132 can receive the policy file and the infrastructure plan data from the cloud infrastructure provisioning platform 120. The dispatch node 132 can parse the policy file to determine one or more imports (e.g., a configuration import, a plan import, and a state import included in the policy file). The dispatch node 132 can parse the policy file in any suitable manner as described in further detail herein.

After determining the one or more imports from the policy file, the dispatch node 132 can utilize the imports. For example, the dispatch node 132 can query the infrastructure plan data (stored in a memory of the dispatch node 132 after receiving the infrastructure plan data) via an API for object data related to the one or more imports. In some embodiments, the query can be referred to as an API call. The dispatch node 132 can determine the object data, based on the query. The object data can be related to the one or more collections of the one or more imports included in the policy file. The dispatch node 132 can execute the policy file based on the object data to obtain a policy check result.

The system 100 of FIG. 1 can be configured to perform any method and/or combination of methods described herein. For example, in various embodiments, a dispatch node (e.g., the dispatch node 132) can include at least one data processor and at least one memory. The memory can store instructions which, when executed by the at least one data processor, result in performing any suitable operations described herein.

III. API Imports and Collections

The following sections describe an API according to various embodiments. Specifically, three imports are described, including a configuration import (e.g., tfconfig), a plan import (e.g., tfplan), and a state import (e.g., tfstate). Each import can comprise one or more collections, where each collection comprises one or more data fields. Each import can include a group of functions, data types, and/or collections. Collections can be groupings of related data fields that have shared attributes and/or characteristics. The API import hierarchy can be flattened in order to increase search speed through the import. By flattening the hierarchy (e.g., a smaller number of total layers of a hierarchy), embodiments are able to make better use of parsing, filtering, searching, etc. protocols.

Embodiments can reduce a large amount of the complexity out of any hardcoded plugins that may exist between the policy check platform and the cloud infrastructure provisioning platform. Such removal of plugins (e.g., data communication plugins between the policy check platform and the cloud infrastructure provisioning platform) decreases the complexity of communications between the devices. Further, rather than providing the relevant infrastructure data via plugins, embodiments can utilize various embodiments to efficiently communicate infrastructure plan data, as described in further detail herein. As such, the imports can be organized, emphasizing a more minimalistic approach than creating and manually updating plugins. The approach, described herein, is rooted in addressing issues specifically related to the policy check platform, such as the amount of policy code necessary to evaluate the data in an infrastructure plan. As such, the imports can take the infrastructure plan data in a low-level format, and provide abstractions to the policy check platform that largely reduce the complexity of code input into the policy check platform to process the infrastructure plan data. As such, a user that creates the policy file does not need to program the policy file to deal with the intricacies of the infrastructure plan data, but can instead utilize one or more imports to interface with the infrastructure plan data. Here the provided abstractions handle complexity by hiding unnecessary details from the user. Thus, enabling the user to implement more complex logic on top of the provided abstraction without understanding or even thinking about all the hidden complexity of the infrastructure plan data.

Various embodiments provide for a policy check platform-friendly data layout. Specifically, embodiments can flatten hierarchical data found in previous import structures into collections that can be efficiently processed by features of the policy language. Further, various embodiments provide for minimum data abstraction. In some embodiments, the imports can provide a minimum amount of abstraction possible to ensure a balance between convenience and maintenance needs as described herein. Further, in some embodiments, the raw, un-abstracted JSON data (e.g., of the infrastructure plan) can be made available under a raw attribute in a plan import (e.g., tfplan.raw) to assist with situations where the abstractions cannot satisfy a particular policy's needs.

A. Import and Collection Features

The following subsection describes various features of the imports and collections that are further described in the following three subsections specifically for a configuration import, a plan import, and a state import.

In various embodiments, there may be some helper functions included as part of the imports. A helper function can be a function or method whose purpose is to assist with processing in repeatable fashion. In some cases, a helper function may not necessarily be required to work with particular data, but can help when the processing is repeatable. However, keeping in line with minimum abstraction, a goal of helpers can be to assist with working with the data at hand versus obfuscating the data in some way where obfuscation creates risk of drift from future potential modifications to the infrastructure plan data, as the obfuscated data is highly susceptible to incorrect changes (e.g., drift over time) since noticing changes in the obfuscated data is difficult.

Various embodiments provide for removal of resource mode classification as being represented by an import different than the configuration import, plan import, and state import. Resource mode (e.g., an indication of whether or not an entity is a resource or data source) may not be represented by a different import than the imports as described herein. The cloud infrastructure provisioning platform, at the lower level, may not distinguish between whether or not an entity is a resource or a data source. To the cloud infrastructure provisioning platform, both of these can be determined to be resources, with a mode distinction (e.g., associated with the entity as an attribute such as a resource mode attribute) of either being a managed resource or data resource. For example, a particular entity in a provisioned cloud infrastructure can be a resource or a data source. A data source can allow data to be fetched or computed for use for elsewhere in the cloud infrastructure. In some embodiments, a data source can allow information defined outside of the cloud infrastructure to be retrieved by and/or utilized by the cloud infrastructure. In contrast, a resource can be a component of the infrastructure (e.g., a physical server, a virtual machine, etc.). The resource mode attribute can be included in the any suitable collection (e.g., a resource collection) of the configuration import, for example.

Using a new API, as described herein, the resource mode attribute may be discovered using a filter off of one of the main imports (e.g., the configuration import, the plan import, and the state import). For example, on a collection of resource changes in a plan import, all of the managed resources can be filtered to include only managed resources that have planned resource changes. As an illustrative example, a filter can be applied to resource changes collection (e.g., resource_changes) of the plan import (e.g., tfplan). The filter below can return the resource changes (rc) that include attribute of mode equal to "managed" (e.g., a managed resource). Thus the filter allows for the API to efficiently search though the imports and associated collections for the requested data.

all_managed_resources=filter tfplan.resource_changes as _, rc {
  rc.mode is "managed"
}

In various embodiments, collections in the API can be indexed. The collections can be indexed off of a recognizable index related to the collection. For example, the index can be a resource address, the module address, a unique identifier (e.g., a variable/output name, module call index, etc.), a delimiter (e.g., :, +, -, ;, ., /, etc.), a UUID, a checksum, or any other suitable data item utilized as an index.

As an illustrative example, a "module calls" collection in the configuration import (e.g., tfconfig) can have an index that is composed of [module address:]name, where "name" can be a name of the index of the module block (e.g., module "foo"). The closed brackets of "[module_address:]" component can indicate, in some embodiments, that zero or one module_address can be included. If not in a root module, then the module address can be included as well, which in the context of a module call, may refer to the module that the actual configuration resides in. In some embodiments, these fields can be delimited by a colon, where there are two fields to join.

A module can be a container for multiple resources that are used together. A particular cloud infrastructure configuration can have at least one module, known as the root module. The root module can consist of the resources defined in the configuration files (e.g., .tf files, etc.) in a main working directory. A particular module (e.g., a root module) can call other modules, which provides the child module's resources into the cloud infrastructure configuration in a concise way. Modules can also be called multiple times, either within the same cloud infrastructure configuration or in separate cloud infrastructure configuration, allowing resource configurations to be packaged and re-used. To call a module means to include the contents of that module into the cloud infrastructure configuration with specific values for its input variables. A modules can be called from within other modules in any suitable manner (e.g., using module blocks, etc.).

B. Expression Format and Block Expression Format

Prior to discussing the configuration import in the following subsection, the expression format for the configuration import (e.g., tfconfig) will be discussed. In some embodiments, the cloud infrastructure configuration values can be represented in a cloud infrastructure provisioning platform's JSON format via the expression format. This can be a verbose format for expressing a (parsed) configuration value independent of a configuration source code, which is not 100% available to cloud infrastructure provisioning platforms. There can be two parts to an expression format. First, any completely constant values can be expressed in a constant value field. Second, any expressions that require some degree of evaluation to generate a final value—even if that value is known at cloud infrastructure plan time—are not expressed in the configuration. Instead, any particular references that are made are added to a references field.

As an illustrative example of the expression format, which may be utilized to format the configuration import, to determine whether or not an output is working off of a particular resource value, a policy file may include the following pseudocode that utilizes the configuration import:

import "tfconfig"
main=rule {
all filter tfconfig.outputs as _, output {
output.module_address is "module.foo" and
output.name is "instance_id"
}as _, output {
output.expression.references contains "aws_instance.foo"
}
}

In some embodiments, the configuration import can be represented by a block expression format. Expanding upon the above expression format, a block expression format (e.g., a multi-value expression format) is similar, but a root value is a keyed map of expression formats. The key map can be followed until a scalar expression value is encountered (e.g., a field that is not a block in the schema). As an illustrative example of the block expression format, expressions in an aws_instance can be validated using the following example format:

```
import "tfconfig"
main=rule{
all filter tfconfig.resources as _, rc{
    rc.address is "module.foo.aws_instance.foo"
} as _, rc{
    rc.expressions.ami.constant_value is "ami-abcdefgh012345"
    }
}
```

Furthermore, in some embodiments, a helper (e.g., a helper function) can be available to remove indexes from the address found in the plan import (e.g., tfplan) and the state import (e.g., tfstate), allowing the addresses in these imports to be utilized in the configuration import (tfconfig). In particular, tfconfig.strip index( ) (Helper) can allow those addresses to be used in the tfconfig collections when those addresses are expanded from expressions found in count and for_each. This can be used to help facilitate cross-import lookups for data between the plan import, the state import, and the configuration import. As an illustrative example of a helper function that strips indices from the plan import can as described in a JSON format can be as follows:

```
import "tfconfig"
import "tfplan"
main=rule {
all filter tfplan.resource_changes as _, rc {
    rc.mode is "managed" and
    rc.type is "aws_instance"
} as _, rc {
    tfconfig. resources [tfconfig.strip_index(rc.address)]
        .expressions
        .ami.constant_value is "ami-abcdefgh012345"
    }
}
```

C. Configuration Import

Figure 2A:
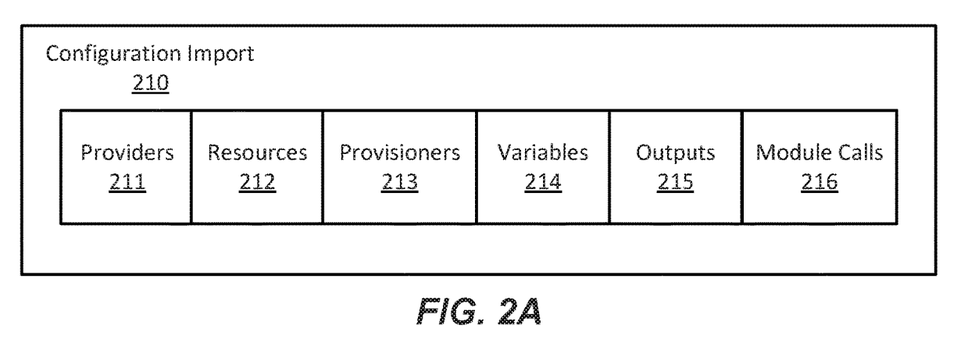
FIGS. 2A-2C depict block diagrams illustrating various imports, in accordance with some example embodiments.

FIG. 2A illustrates a configuration import 210, according to various embodiments. The configuration import 210 (e.g., a tfconfig import) can provide a representation of the configuration of the cloud infrastructure as it is seen at plan time. The configuration import 210 can allow access to the cloud infrastructure configuration at plan time, while preparing to potentially update the cloud infrastructure configuration. Four exemplary use cases for the configuration import 210 include 1) naming conventions (e.g., requiring that configuration elements are named in a way that conforms to particular standard), 2) required inputs and outputs (e.g., users may require a particular set of input variable names across all workspaces or may require a particular set of outputs for asset management purposes), 3) enforcing particular modules (e.g., users may provide a number of building block modules and require that each workspace be built only from combinations of these building block modules), and 4) enforcing particular providers or resources (e.g., users may attempts to require or prevent the use of particular providers and/or particular resources so that configuration authors cannot use alternative approaches to work around policy restrictions).

The configuration import 210 can include various data collections that relate to the configuration of a cloud infrastructure. In some embodiment, the configuration import 210 can include a providers collection 211, a resources collection 212, a provisioners collection 213, a variables collection 214, an outputs collection 215, and/or a module calls collection 216. However, it is understood that the configuration import 210 can include any suitable data collections.

The providers collection 211 (e.g., tfconfig.providers) can represent a configuration for all provider instances across all modules in the configuration. The providers collection can be indexed by an opaque key. An identifier or key can be an opaque key when the opaque key identifies other data (e.g., is an index to a provider) but provides no information about the other data that the opaque key identifies. As such the opaque key may appear to be a seemingly random number or string that itself provides no information about the provider that the opaque key is index to. The opaque key can be utilized in any suitable manner by the user of the APIs and how a particular policy as code is created.

The providers collection can include a number of fields. For example, the fields in the providers collection can include a provider_config_key (e.g., an opaque configuration key, used as the index key), a name (e.g., a name of the provider, such as aws), an alias (e.g., an alias of the provider, such as "east", which may be empty for a default provider), a module_address (e.g., an address of the module this provider appears in), a config (e.g., a block expression format with provider configuration values), and a version_constraint (e.g., a defined version constraint for this provider).

The resources collection 212 (e.g., tfconfig.resources) can represent a configuration of all resources across all modules in the configuration. The resources collection can be indexed by a resource address. In some embodiments, the resources collection can also include a module_address field, which includes a similar syntax to the resource address. The module_address can be the index in some embodiments.

The resources collection 212 can include a number of fields. For example, the fields in the resources collection 212 can include an address (e.g., a resource address, which may be an index of the resources collection), a module_address (e.g., a module address), a mode (e.g., a resource mode, either managed (resources) or data (data sources)), a type (e.g., a type of resource, such as a data_source in data_source.nameABC), a name (e.g., a name of the resource, such as nameABC in data_source.nameABC), a provider_config_key (e.g., an opaque configuration key that may be the index of tfconfig.providers), a provisioners (e.g., an ordered list of provisioners for a resource, where the syntax of the provisioners can match those found in tfconfig.provisioners, but is a list indexed by the order in which the provisioners are listed in the resource), a config (e.g., a block expression format of the configuration values found in the resource), a count (e.g., an expression data for the count value in the resource), a for_each (e.g., an expression data for the for_each value in the resource), and a depends_on (e.g., contents of the depends_on config directive, which declares explicit dependencies for this resource). The depends_on field is a list of dependencies for the associated resource. The expression data can be data related to and/or resulting from the associated expression. For example, the expression of "for each" can be associated with data that is the result of the "for each" expression (e.g., a result of the evaluation of the expression).

The provisioners collection 213 (e.g., tfconfig.provisioners) can represent a configuration of the provisioners found across the resources in the cloud infrastructure configuration. While the provisioners are normally bound to a resource in an ordered fashion, this collection allows for the filtering of provisioners within a single expression. The provisioners collection 213 can be indexed with a key following the format resource_address:index, with each field matching their respective field in the particular element of resource_address (e.g., a resource address as seen in tfconfig.resources), type (e.g., a provisioner type, such as local_exec), index (e.g., a provisioner index as it shows up in the resource provisioner order), and config (e.g., a block expression format of the configuration values in the provisioner).

The variables collection 214 can represent a configuration of all variable definitions across all modules in the configuration. Note that this tracks variable definitions, not values. Values are only exposed through tfplan.variables, for the root module. The variables collection can be indexed by the key format module_address:name, with each field matching their respective name of module_address (e.g., an address of the module the variable was found in), name (e.g., a name of the variable), default (e.g., a defined default value of the variable), and description (e.g., a description of the variable).

The outputs collection 215 can represent a configuration of all output definitions across all modules in the configuration. Note that this tracks output definitions, not values. Values are only exposed through tfstate.outputs, for the root module. The outputs collection can be indexed by the key format module_address:name, with each field matching their respective name of module_address (e.g., an address of the module the output was found in), name (e.g., a name of the output), sensitive (e.g., indicates whether or not the output was marked as sensitive), value (e.g., an expression format for the output), description (e.g., a description of the output), and depends_on (e.g., a list of resource names that the output depends on, which can be hard-defined output dependencies as defined in the depends_on field in an output declaration, not the dependencies that get derived from natural evaluation of the output expression).

The module calls collection 216 can represent a configuration of all module calls across all modules in the configuration. In some embodiments, the module calls collection 216 may be a module stanza in any particular configuration, and not the module to which the module calls themselves relate. For example, a declaration for module.nameABC would actually be declared in the root module not the module calls collection 216, which can be represented by a blank field in module_address. The module calls collection 216 can succinctly describe all of the module calls available across all modules, while not needing to reduplicate the functionality of every call within the module calls collection 216. The module calls collection 216 can be indexed by the key format module_address:name, with each field matching their respective name of module_address (e.g., the address of the module the declaration was found in), name (e.g., a name of the module), source (e.g., contents of the source field), config (e.g., an expression format for all parameter values sent to the module), count (e.g., an expression format for the count field), for_each (e.g., an expression format for the for_each field), and version constraint (e.g., a string value found in the version field of the module declaration).

Some items found in the configuration import have been omitted for brevity, however it is understood that any other suitable collections and/or data fields can be included in the configuration import that are included in the infrastructure data and/or are derived from the infrastructure data. For example, the resources collection 212 can further include a schema version field. The schema version field can include the resource's configuration schema version. With access to the specific provider for this resource, this can be used to determine the correct schema for the configuration data supplied in expressions.

D. Plan Import

Figure 2B:
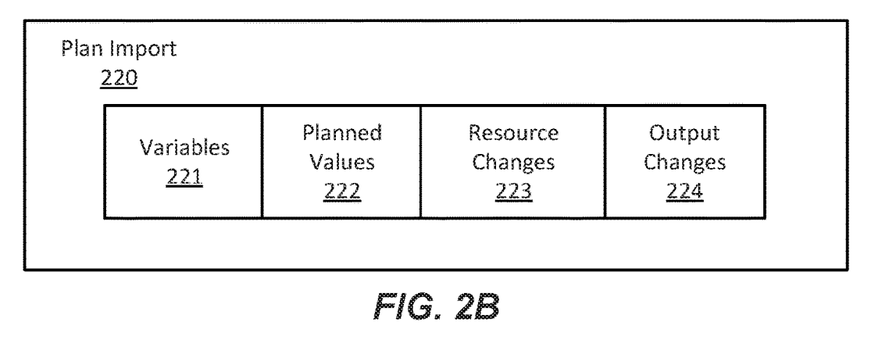

FIG. 2B illustrates a plan import 220, according to various embodiments. The plan import 220 (e.g., tfplan import) can provide a representation of the cloud infrastructure plan. The plan import 220 can include the various data collections. For example, the plan import 220 can include a variables collection 221, a planned values collection 222, a resource changes collection 223, and an output changes collection 224. However, it is understood that the plan import 220 can include any suitable data collections.

Additionally, in some embodiments, the plan import can provide the raw data provided by the JSON representation of the Cloud infrastructure provisioning platform plan stored by Cloud infrastructure provisioning platform Cloud. In some embodiments, the plan import can include a version number (e.g., tfplan.terraform_version). The version can indicate the version utilized to make the plan. The version can be a string field, for example. The version can be a top-level non-collection attribute.

The variables collection 221 can represent values of variables that have been set in the plan itself. The variables collection 221 (e.g., tfplan.variables) can include the variables set in the root module when creating the plan. The variables collection 221 can be indexed on the name of the variable. For example, valid values of the variables collection 221 can include name and value. The name can be the name of the variable, which may be used as the collection key. The value can be the value of the variable assigned during the plan.

The planned values collection 222 can represent a state representation of planned values, or an estimation of what the state will look like after the plan is applied. For example, the state representation can represent the state of the cloud infrastructure. The state representation can indicate the state of the cloud infrastructure that is to be provisioned. In the plan import, the represented state can be the to be provisioned state rather than the currently existing state of the cloud infrastructure. The planned_values collection (e.g., tfplan.planned_values) can include a state representation of planned values, or an estimation of what the state will look like after the plan is applied.

The resource changes collection 223 can represent a set of change operations for resources and data sources within the plan. The resource changes collection (e.g., tfplan.resource_changes) can include the set of change operations for resources and data sources within this plan. For example, the resource changes collection 223 can include resources that have been found in the configuration and state, regardless of whether or not they are changing. The resource changes collection 223 can be indexed on a complete resource address as the key. If deposed is non-empty, it can be appended to the end, and may look something like aws_instance.foo:deposed-abc123.

An element of the resource change collection 223 can contain the following data fields of address (e.g., an absolute resource address—also the key for the collection's index, if deposed is empty), module_address (e.g., a module portion of the absolute resource address), mode (e.g., a resource mode (either managed or data)), type (e.g., a resource type, such as aws_instance for aws_instance.foo), name (e.g., a resource name, such as foo for aws_instance.foo), index (e.g., a resource index, which can be either a number or a string), provider_name (e.g., a name of the provider this resource belongs to, which can allow the provider to be interpreted unambiguously in the unusual situation where a provider offers a resource type whose name does not start with its own name, such as the googlebeta provider offering google_compute_instance), deposed (e.g., an identifier used during replacement operations, and can be used to identify the exact resource being replaced in state), and change (e.g., data describing the change that will be made to this object).

The change field found in the resource changes collection 223 of the plan import 220 (e.g., tfplan.resource_changes), and additionally located in the output changes collection 224 of the plan import 220 (e.g., tfplan.output_changes) in some embodiments, can be an object containing one or more common fields. For example, the change filed can include an actions field. The actions field can be a list of actions being carried out for this change. The order can be important, for example a regular replace operation is denoted by ["delete", "create"], but a create_before_destroy resource will have an operation order of ["create", "delete"].

The change field can also include a before field. The before field can include a representation of the resource data object value before the action. For create-only actions, this is unset. For no-op actions, this value can be identical with after. The change field can also include an after field. The after field can include a representation of the resource data object value after the action. For delete-only actions, this is unset. For no-op actions, this value will be identical with before. In some embodiments, unknown values may not show up in this field.

The change filed can also include an after unknown field. The after unknown field can include a deep object of Booleans that can denote any values that are unknown in a resource. These values were previously referred to as "computed" values. If a value cannot be found in this map, then its value should be available within after, so long as the operation supports it.

The output changes collection 224 can represent changes to outputs within the plan. The output changes collection 224 (e.g., tfplan.output_changes) can include the change operations for outputs within the plan. The output changes collection 224 can be indexed by the name of the output. The fields in a collection value can include name and change. The name field can include the name of the output and the index key. The change field can include a change representation for the output.

In some embodiments, the plan import 220 can include a raw collection (e.g., tfplan.raw). The raw collection can include raw, unparsed infrastructure data (e.g., JSON data) stored for the plan by the cloud infrastructure provisioning platform.

E. State Import

Figure 2C:
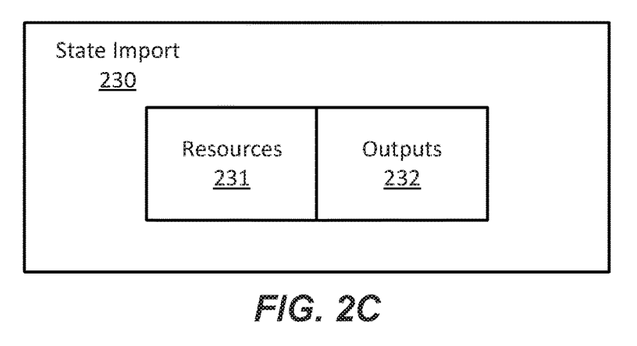

FIG. 2C illustrates a state import 230, according to various embodiments. The state import 230 (e.g., tfstate) can include data relevant to the existing cloud infrastructure state at plan time. The data in the state import 230 can represent the state before the plan is applied. Data for the predicted state can be included in a planned values collection 222 of the plan import 220 (e.g., tfplan.planned_values), which can contain the same collections as the state import 230 without the top-level non-collection terraform version attribute. One exception to the above are data sources that were able to be resolved at refresh time. These update the state ahead of the plan, and as such will contain the most up to date data. However, it is understood that the state import 230 can include any suitable data collections.

The state import 230 can include a version number (e.g., tfstate.terraform_version). The version can be a version of Cloud infrastructure provisioning platform that the state was saved with. In some embodiments, the version can be the same version that the last apply was made with. The version in the state import 230 can differ from the version in the plan import, when upgrading Cloud infrastructure provisioning platform.

The state import 230 can also a resources collection 231 (e.g., tfstate.resources). The resources collection 231 can be a collection of all resources in the state, across all modules. The resources collection 231 can be indexed on the complete resource address as the key. An element in the resources collection 231 can include any suitable values. For example, the resources collection 231 can include an address (e.g., an absolute resource address—also the key for the collection's index), a module_address (e.g., an address portion of the absolute resource address), a mode (e.g., a resource mode (either managed or data)), a type (e.g., a resource type, example: aws_instance for aws_instance.foo), a name (e.g., a resource name, example: foo for aws_instance.foo), an index (e.g., a resource index, which can be either a number or a string), a provider name (e.g., a name of the provider this resource belongs to), one or more values (e.g., an object (map) representation of the attribute values of the resource, whose structure depends on the resource type schema), depends_on (e.g., addresses of the resources that this resource depends on), tainted (e.g., true if the resource has been explicitly marked as tainted in the state), and deposed_key (e.g., set if the resource has been marked deposed and will be destroyed on the next apply). When accessing the proposed state through proposed values, in some embodiments, unknown values can be omitted.

The state import 230 can include an outputs collection 232 (e.g., tfstate.outputs). The outputs collection 232 can be a collection of outputs from the root module of the state. In some embodiments, no child modules may be included in this output set, and there may be no way to fetch child module output values. This is beneficial to encourage the correct flow of outputs to the recommended root consumption level. The outputs collection 232 can be indexed on the output name, with the fields of name (e.g., a name of the output, also the collection key), sensitive (e.g., an indication of whether or not the value was marked as sensitive in configuration), and a value (e.g., a value of the output).

IV. Methods

Figure 3:
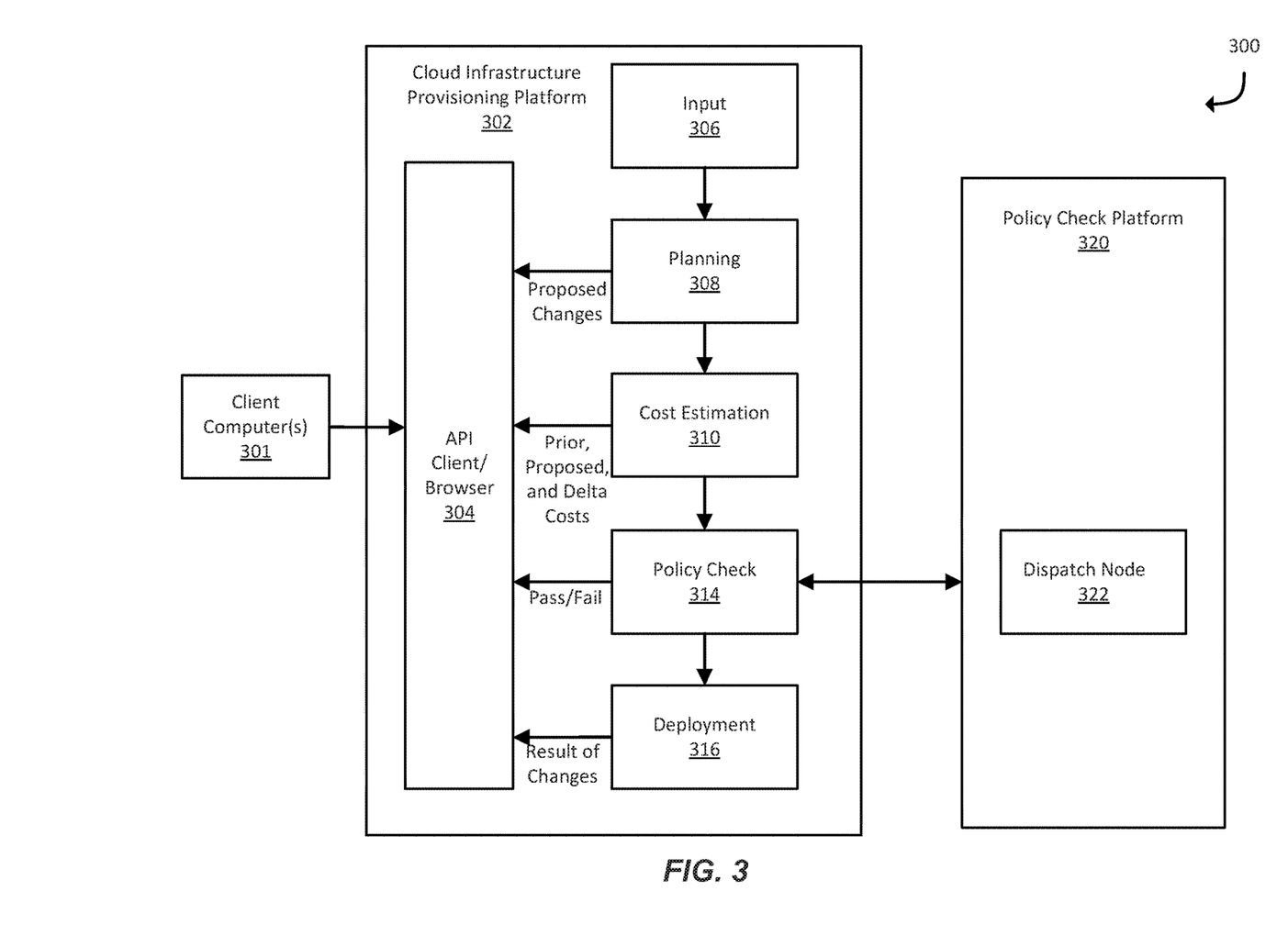
FIG. 3 depicts a hybrid flowchart illustrating a cloud infrastructure provisioning process, in accordance with some example embodiments.
Figure 4:
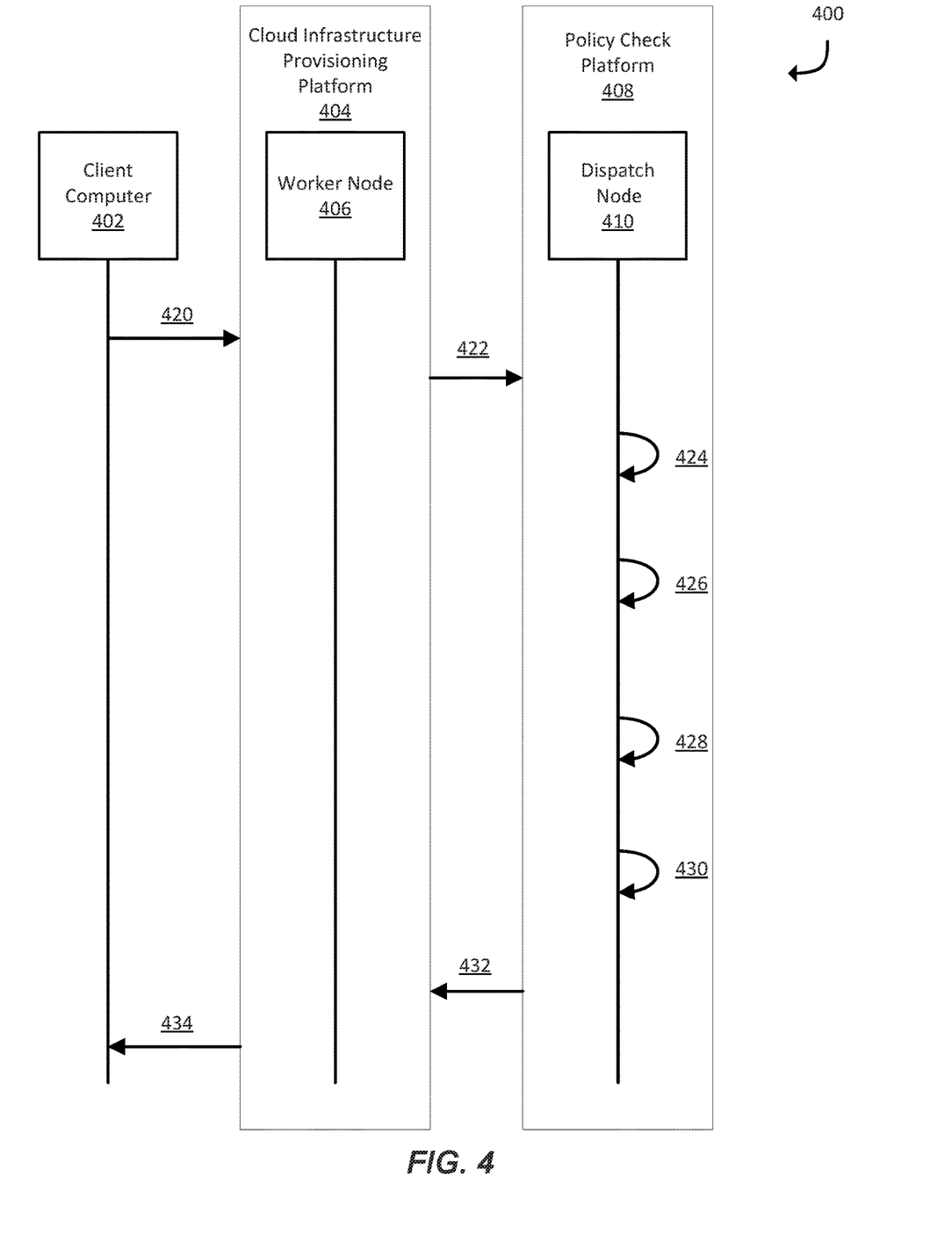
FIG. 4 depicts a flowchart illustrating a policy check process, in accordance with some example embodiments.

Various embodiments can use the systems and apparatuses described herein to at least establish and utilize one or more imports to perform a policy check related to a provisioned cloud infrastructure. FIGS. 3-4 describe some examples of such methods. In some embodiments, a dispatch node may include the dispatch nodes 132-136 and a worker node may include the worker nodes 122-126 of FIG. 1.

A. Infrastructure Provisioning

FIG. 3 shows a hybrid flowchart of an infrastructure provisioning method according to embodiments. A method 300 illustrated in FIG. 3 will be described in the context of a policy author (e.g., a user) that creates and provides a policy file to a cloud infrastructure provisioning platform 302. The policy file can be utilized to determine whether or not a change in cloud infrastructure (e.g., being provisioned by the cloud infrastructure provisioning platform 302) is consistent with one or more policies depicted in the policy file. It is understood, however, that the invention can be applied to other circumstances in which, for example, a platform can request various imports in an API call to the cloud infrastructure provisioning platform 302. The cloud infrastructure provisioning platform 302 can include a client API (e.g., API client/browser) 304 that communicates data from the processing steps performed by the cloud infrastructure provisioning platform 302 to the client computer(s) 301.

Prior to step 306, the cloud infrastructure provisioning platform 302 can receive inputs such as cloud-based infrastructure configurations or changes, workspace variables, a current state of an already-provisioned cloud infrastructure, etc. These inputs can be provided by the client computer(s) 301, in some embodiments. In some embodiments, the inputs can include configurations and proposed changes from one or more developers that provide a technical specification for one or more cloud-based applications.

At step 306, the cloud infrastructure provisioning platform 302 can create and modify a configuration file. The configuration file can depict a configuration of the cloud infrastructure to be provisioned. The configurations can be ".tf" files and can be stored in any suitable repository. During input, the cloud infrastructure provisioning platform 302 can resolve any external references that the configuration makes to modules and/or provider plugins.

At step 308, the cloud infrastructure provisioning platform 302 can perform planning. The cloud infrastructure provisioning platform 302 can assemble the inputs to generate a cloud infrastructure plan for a run-phase that will accommodate the technical specification and proposed changes to the cloud-based infrastructure configuration. For example, the cloud infrastructure provisioning platform 302 can distinguish between resource values before and after the changes are to be applied, and can represent them as such. Each of these representations of resource values can implement a values-representation type, enabling the system to estimate prices or costs for before and after a plan is applied, at step 310. A cloud infrastructure plan can be a file created as a result of a cloud infrastructure provisioning platform plan and is the input to an apply cloud infrastructure changes function of the cloud infrastructure provisioning platform. The plan represents the changes that the cloud infrastructure provisioning platform needs to make to infrastructure to reach the desired state represented by the configuration. The infrastructure plan file (e.g., infrastructure plan data) can include data that the plan import can access. In some embodiments, the technical specification and proposed changes can be sent to the client computer(s) 301 via the API 304.

At step 310, the cloud infrastructure provisioning platform 302 can perform cost estimation. For example, the cloud infrastructure provisioning platform 302 can generate a per-resource hourly and monthly cost, along with a monthly cost delta. The use of cost estimation can be performed when cost estimation is enabled and the utilized provider includes cost estimation support. During cost estimation, the cloud infrastructure provisioning platform 302 can receive price information from a set of price resolvers that resolve a price for each resource specified by cloud infrastructure provisioning platform 302, and which price is provided by the cloud providers or other resource providers via provider APIs.

At step 314, the cloud infrastructure provisioning platform 302 can initiate a policy check. For example, the cloud infrastructure provisioning platform 302 can determine a policy file to evaluate for the current cloud infrastructure being provisioned. In some embodiments, the cloud infrastructure provisioning platform 302 can determine one or more policy files that have been received from the client computer 301 and/or retrieved from a policy database. The policy file can be a policy as code file that, when executed, can determine whether or not a current provisioning activity is consistent with the established policies.

The cloud infrastructure provisioning platform 302 can provide at least the policy file and the infrastructure plan data to a policy check platform 320 to evaluate the policy file. The policy check platform 320 can allow policies to be automatically enforced in the cloud-based infrastructure provisioning workflow. Administrators can then have the ability via the policy file to approve significant changes or to prevent specific workspaces from exceeding predetermined thresholds or policy limits. In some embodiments, policies can be enforced based on the type of infrastructure created, how it is used, and which devices, users, organizations, etc. have access to the infrastructure.

For example, the policy file can enable an organization to define policies that are enforced against infrastructure between the plan and apply phases of an infrastructure provisioning process. Compared to many tools that scan existing infrastructure for policy infractions, the policy check platform 320 can proactively prevent provisioning of out-of-policy infrastructure. In some embodiments, the policy file can be configured to ensure that consistent financial governance is applied to infrastructure changes. For example, in some implementations, the policy file can implement and enforce a quota system, whereby teams or groups can be assigned a maximum spend quota. Therefore, instead of developers waiting weeks or longer to provision infrastructure, which becomes a bottleneck for deployment, policy-as-code allows an organization to separate the definition of the policy from the execution of the policy.

By addressing provisioning costs from a more proactive standpoint, organizations can take an approach in which IT Ops researches problems that impact cost, collates and collects data to formalize policies and influence actions across all DevOps teams, and enables everyone in the organization to take consistent actions based on estimated infrastructure costs and company policy. Centralized teams codify policies enforcing security, compliance, and operational best practices across all cloud provisioning. Automated enforcement of policies ensures changes are in compliance without creating a manual review bottleneck.

In particular, the cloud infrastructure provisioning platform 302 can provide the policy file and the infrastructure plan data to the policy check platform 320. After receiving the policy file, the policy check platform 320 can instantiate a dispatch node 322. The dispatch node 322 can be, for example, a virtual machine configured to execute policy files. The policy check platform 320 can provide the policy file, or in some embodiments one or more policy files, to the dispatch node 322.

Upon receiving the policy file, the dispatch node 322 can parse the policy file to determine one or more imports included in the policy file. The dispatch node 322 can then query the infrastructure plan data for the imports. In some embodiments, the query for the imports can be an API call. Based on the query, the dispatch node 322 can determine object data via the API call.

After determining the imports, the dispatch node 322 can execute the policy file based on the object data to obtain a policy check result. The policy check result can be an indication of whether or not the currently infrastructure being provisioned is consistent with the one or more policies included in the policy file. For example, the policy can be a Boolean value (e.g., True if the infrastructure is consistent with the policy file or False if the infrastructure is not consistent with the policy file).

After, determining the policy check result, the dispatch node 322 can provide the policy check result to the cloud infrastructure provisioning platform 302. In some embodiments, the dispatch node 322 can provide the policy check result to the cloud infrastructure provisioning platform 302 via the policy check platform 320.

The cloud infrastructure provisioning platform 302 receives the policy check result and performs any suitable processing with and/or based on the policy check result. For example, the cloud infrastructure provisioning platform 302 can modify the policy check result by formatting the policy check result into a human readable format. The cloud infrastructure provisioning platform 302 can then, in some embodiments, provide the policy check result to the client computer 301 via the API 304.

At step 316, after initiating and completing the policy check in conjunction with the policy check platform 320, the cloud infrastructure provisioning platform 302 can perform deployment. For example, the cloud infrastructure provisioning platform 302 can apply any changes to an existing cloud infrastructure such that the changes modify the existing cloud infrastructure to match the planned cloud infrastructure. For example, the cloud infrastructure provisioning platform 302 can apply approved changes or configurations, to create a new state of the cloud-based infrastructure according to changed resources per the plan. The results of these changes can be sent to the client computer 301 via the API 304 by the cloud infrastructure provisioning platform 302. In some embodiments, the cloud infrastructure provisioning platform 302 can commit the changes to any external provider(s) and store the resulting state in the current directory or the configured backend.

B. Policy Validation

FIG. 4 shows a flowchart of a policy validation method according to embodiments. The method illustrated in FIG. 4 will be described in the context of a client computer 402 providing a policy file to a cloud infrastructure provisioning platform 404 to evaluate whether or not a current cloud infrastructure being provisioned is consistent with one or more policies included in the policy file. The cloud infrastructure provisioning platform 404 can provide the policy file to a policy check platform 408 as well as one or more imports via an exposed API. It is understood, however, that the invention can be applied to other circumstances (e.g., the cloud infrastructure provisioning platform 404 retrieving the policy file from a policy database, the client computer 402 providing the policy file directly to the policy check platform 408, etc.).

The method 400 illustrated in FIG. 4 can be performed by a client computer 402, a cloud infrastructure provisioning platform 404, which can include a worker node 406, and a policy check platform 408, which can include a dispatch node 410. Prior to step 420, a policy author can create a policy file in any suitable manner using a client computer 402. For example, the policy author can write a policy file in an integrated development environment (IDE) or other suitable software. In some embodiments, the policy author can select a pre-created policy file from a plurality of available policy files.

The policy file can include a policy as code document. In some embodiments, the policy file can include code written in a high-level language to manage and/or automate policies. The policy file can comprise one or more imports. For example, the one or more imports include a configuration import, a plan import, and/or a state import. Each import of the one or more imports can comprise one or more collections, and each collection can comprise one or more data fields, as described herein.

At step 420, the client computer 402 can provide the policy file to the cloud infrastructure provisioning platform 404 via any suitable communication channel (e.g., via API communication). In some embodiments, the client computer 402 can upload the policy file into the cloud infrastructure provisioning platform 404. In some embodiments, the client computer 402 can provide the policy file to a policy database (not shown). At a later point in time, for example, after collecting planned changes (e.g., in infrastructure plan data) to a previously provided cloud-based infrastructure, the cloud infrastructure provisioning platform 404 can retrieve the policy file from the policy database.

At step 422, after receiving the policy file from the client computer 402, the cloud infrastructure provisioning platform 404 can provide the policy file and the infrastructure plan data to a policy check platform 408. In some embodiments, the cloud infrastructure provisioning platform 404 can comprise the worker node 406. The worker node 406 can receive the policy file form the client computer 402 can provide the policy file to the policy check platform 408.

At step 424, after receiving the policy file from the cloud infrastructure provisioning platform 404, the policy check platform 408 can instantiate the dispatch node 410. In some embodiments, the dispatch node 410 may have been previously instantiated. The policy check platform 408 can then provide the policy file to the dispatch node 410. In some embodiments, the cloud infrastructure provisioning platform 404 can provide the policy file directly to the dispatch node 410.

The dispatch node 410 can parse the policy file to determine the one or more imports. In some embodiments, the dispatch node 410 can parse the policy file to determine the one or more fields of the one or more imports included in the policy file.

At step 426, after determining the one or more imports, the dispatch node 410 can query the infrastructure plan data (stored in a memory) via an API for object data related to the one or more fields of the one or more imports. In some embodiments, the query can be referred to as an API call. Then, at step 428, the dispatch node 410 can determine the object data, based on the query. The object data can be related to the one or more collections of the one or more imports. In some embodiments, the dispatch node 410 can filter the infrastructure plan data based on the policy file. The dispatch node 410 can filter the object data based on any suitable quantifier. For example, for the plan import, the dispatch node 410 can filter the resource changes collection based on a particular data field of the resource changes collection (e.g., a data field of "mode"). As such, the dispatch node 410 can evaluate the policy file based on the filtered data, rather than all of the data of the plan file.

At step 430, the dispatch node 410 can execute the policy file based on the object data to obtain a policy check result.

At step 432, after determining the policy check result, the dispatch node 410 can provide the policy check results to the cloud infrastructure provisioning platform 404. In some embodiments, the dispatch node 410 can provide the policy check result to the worker node 406.

In other embodiments, the worker node 406 and/or the cloud infrastructure provisioning platform 404 can modify the policy check result to obtain a modified policy check result. For example, the worker node 406 can convert the policy check result into a human readable format or any other suitable format.

At step 434, the cloud infrastructure provisioning platform 404 can provide the policy check result, or the modified policy check result, to the client computer 402. In some embodiments, the cloud infrastructure provisioning platform 404 can provision cloud-based infrastructure that is consistent with the policy file.

The client computer 402, after receiving the policy check result, or the modified policy check result, can access the newly provisioned cloud-based infrastructure.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
    receiving, by a dispatch node, a policy file and infrastructure plan data from a cloud infrastructure provisioning platform, wherein the policy file comprises one or more imports, wherein the one or more imports include a configuration import, a plan import, and/or a state import, wherein each import of the one or more imports comprises one or more data fields;
    parsing, by the dispatch node, the policy file to determine at least the one or more imports;
    querying, by the dispatch node, the infrastructure plan data stored in a memory via an API for object data related to the one or more data fields of the one or more imports;
    determining, by the dispatch node, based on the query, the object data via the API;
    executing, by the dispatch node, the policy file based on the object data to obtain a policy check result; and
    providing, by the dispatch node, the policy check result to the cloud infrastructure provisioning platform.

2. The method of claim 1, wherein the policy file is created by a client computer, wherein the client computer provides the policy file to the cloud infrastructure provisioning platform, the cloud infrastructure provisioning platform provides the policy file to a policy check platform, and the policy check platform provides the policy file to the dispatch node.

3. The method of claim 1, wherein the dispatch node is instantiated by a policy check platform prior to receiving the policy file.

4. The method of claim 1, executing the policy file further comprises:
    filtering, by the dispatch node, the received object data based on the policy file.

5. The method of claim 1, wherein the cloud infrastructure provisioning platform stores an infrastructure plan, wherein after querying the cloud infrastructure provisioning platform for object data, the cloud infrastructure provisioning platform determines the object data based on the query and the infrastructure plan.

6. The method of claim 1, wherein the one or more data fields are indexed with a resource address or a module_address.

7. The method of claim 1, wherein the object data includes configuration data, plan data, and/or state data.

8. A dispatch node for managing imports of a cloud infrastructure provisioning platform:
    at least one data processor; and
    at least one memory storing instructions which, when executed by the at least one data processor, result in operations comprising:
        receiving, by a dispatch node, a policy file and infrastructure plan data from the cloud infrastructure provisioning platform, wherein the policy file comprises one or more imports, wherein the one or more imports include a configuration import, a plan import, and/or a state import, wherein each import of the one or more imports comprises one or more data fields;
        parsing, by the dispatch node, the policy file to determine at least the one or more imports;
        querying, by the dispatch node, the infrastructure plan data stored in a memory via an API for object data related to the one or more data fields of the one or more imports;
        determining, by the dispatch node, based on the query, the object data via the API;
        executing, by the dispatch node, the policy file based on the object data to obtain a policy check result; and
        providing, by the dispatch node, the policy check result to the cloud infrastructure provisioning platform.

9. The dispatch node of claim 8, wherein the policy file is created by a client computer, wherein the client computer provides the policy file to the cloud infrastructure provisioning platform, the cloud infrastructure provisioning platform provides the policy file to a policy check platform, and the policy check platform provides the policy file to the dispatch node.

10. The dispatch node of claim 8, wherein the dispatch node is instantiated by a policy check platform prior to receiving the policy file.

11. The dispatch node of claim 8, wherein executing the policy file further comprises:
filtering, by the dispatch node, the received object data based on the policy file.

12. The dispatch node of claim 8, wherein the cloud infrastructure provisioning platform stores an infrastructure plan, wherein after querying the cloud infrastructure provisioning platform for object data, the cloud infrastructure provisioning platform determines the object data based on the query and the infrastructure plan.

13. The dispatch node of claim 8, wherein the one or more data fields are indexed with a resource address or a module_address.

14. The dispatch node of claim 8, wherein the object data includes configuration data, plan data, and/or state data.

15. A method comprising:
providing, by the cloud infrastructure provisioning platform, a policy file and infrastructure plan data to a policy check platform comprising at least a dispatch node, wherein the dispatch node parses the policy file to determine at least the one or more imports, queries the infrastructure plan data stored in a memory via an API for object data related to the one or more data fields of the one or more imports, determines, based on the query, the object data via the API, executes the policy file based on the object data to obtain a policy check result, and provides the policy check result to the cloud infrastructure provisioning platform; and
receiving, by the cloud infrastructure provisioning platform, the policy check result.

16. The method of claim 15 further comprising:
prior to providing the policy file to the policy check platform, receiving, by the cloud infrastructure provisioning platform, an infrastructure configuration.

17. The method of claim 16, further comprising:
generating, by the cloud infrastructure provisioning platform, the infrastructure plan data based on the infrastructure configuration.

18. The method of claim 15, wherein the object data includes, configuration data, plan data, and/or state data.

19. The method of claim 15, wherein the query for the object data is an API call.

20. The method of claim 15 further comprising:
receiving, by a cloud infrastructure provisioning platform, a policy file from an API client/browser, wherein the policy file comprises one or more imports, wherein the one or more imports include a configuration import, a plan import, and/or a state import, wherein each import of the one or more imports comprises one or more data fields; and
after receiving the policy check result, providing, by the cloud infrastructure provisioning platform, the policy check result to the API client/browser.

* * * * *